Jan. 2, 1951        G. T. SMITH        2,536,961
CONVEYER END CONNECTOR AND GAP PLATE
Filed March 28, 1949
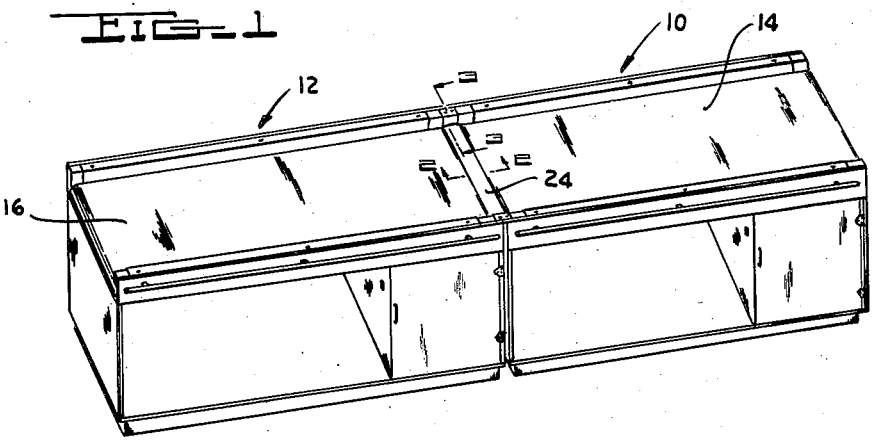
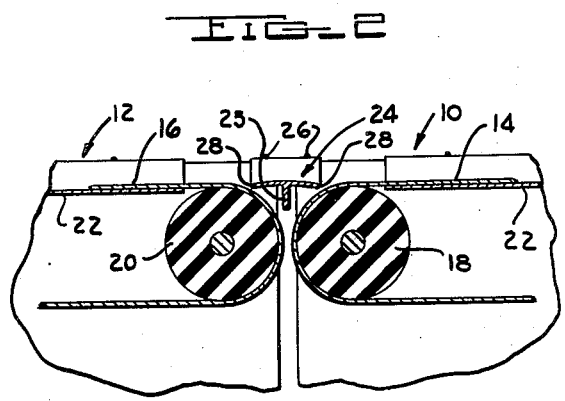
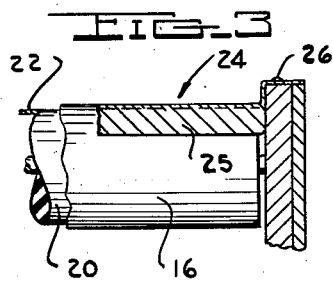
INVENTOR.
GEORGE T. SMITH
BY
ATTORNEY Patented Jan. 2, 1951

2,536,961

UNITED STATES PATENT OFFICE 2,536,961

CONVEYER END CONNECTOR AND GAP PLATE

George T. Smith, Lansing, Mich., assignor to George T. Smith, Inc., Lansing, Mich., a corporation of Michigan Application March 28, 1949, Serial No. 83,840

3 Claims. (Cl. 198—102)

This invention relates to a counter assembly and more particularly to a dual section counter having independently movable conveyor belts arranged on the upper surface of each section, especially adapted for use in connection with a checking out system such as disclosed in my copending application No. 83,838, filed March 28, 1949.

In the above identified application a system for checking out merchandise in a market of the self-serve type is disclosed in which the purchaser places articles selected on a conveyor to be sorted, checked, and priced. Several operating stations have been disclosed along the length of the sectional counter and it is desirable to control the conveyor movement of one section independently of the other section.

It is an object of the present invention to provide two counter sections which are arranged end to end, each provided with independently controlled conveyors, and to provide a gap plate between the adjacent ends of the counter sections which will fill the gap ordinarily present between the arcuate sections of the meeting rollers over which the conveyor belt travels.

Another object of the invention is to unite the two counter sections by a bridge structure which forms the gap plate between the sections and which provides a smooth level area between the two moving sections so that there may be an uninterrupted flow of merchandise from one conveyor belt to the other.

Other objects and advantages of the invention will be more fully understood from the following description, taken in connection with the accompanying drawings in which:

Fig. 1 is a perspective view of two longitudinally extending counter sections joined in end to end arrangement and showing one form of the invention;

Fig. 2 is an enlarged sectional view taken on line 2—2 of Fig. 1 and

Fig. 3 is an enlarged sectional view taken on line 3—3 of Fig. 1.

In the illustrated embodiment of the invention, I have shown a counter comprising two sections 10 and 12 arranged end to end and each is provided with a movable conveyor belt 14 and 16. The conveyor belt of each section extends the full length of each section and is driven over pulleys 18 and 20 located at the opposite ends of the counter sections. The central portion of the belt is supported against sagging by a plate 22 which is flanged at its opposite edges and is secured to the lateral edges of the counter sections; the edges extending vertically above the upper surface of the conveyor belt to serve as guides.

It is important to arrange the counter sections in close proximity and to have the conveyor belts as close together as possible, but due to the arcuate surfaces of the rollers, over which the belts travel, there is a gap between the belt sections. This is objectionable because articles, carried by the belt may become lodged therebetween.

This objectionable feature has been overcome by the present invention in the provision of a bridge over the gap which provides a smooth, substantially flush surface along the upper surface of the two adjacent conveyor belts.

The bridge comprises a transversely extending plate 24 which has its opposite ends overlapping the adjacent ends of the two counter sections and secured to each counter section. The plate 24 is substantially T-shaped in cross section, as at 25, with upturned ends overlapping the lateral edges of the adjacent counter sections and secured thereto by fastening means 26 such as bolts, screws, or the like. The plate 24 is of a width to overlie the top surfaces of the arcuate portions of the conveyor belts. The upper surface of the plate is lightly crowned to provide an uninterrupted flow of merchandise from one belt to the other with a minimum of resistance to passage thereover. The crown enables the merchandise passing thereover to be in contact therewith substantially along a line rather than over a flat surface, and thus reduces the friction opposing movement of the merchandise to insure uninterrupted flow.

The opposite edges of the plate 24 are thickened, as at 28, which together with the rib 25, form a rigid transverse bridge between the two united sections.

By uniting the separate counter sections in this manner and providing individually controlled conveyors, variations in control of speed is permitted without departing from any variation in flow of work over the counters. This also permits the most efficient arrangement of the counters within the available floor space. The bridge is secured to the united counters in such a manner that the belts are held in desired alignment and there is no break or interruption between the separate conveyors.

It will be understood that various changes including the size, shape, and arrangement of parts may be made without departing from the spirit of my invention and it is not my intention to

Having thus described my invention, I claim:

1. A sectional counter assembly comprising, a first counter section, a second counter section arranged end to end with said first section and in abutting relation thereto, a movable conveyor belt for each counter section extending substantially the full length of each section supporting means for each belt to prevent sagging thereof, and a stationary bridge plate overlapping the adjacent ends of said conveyor sections having a convex surface substantially flush with the upper surface of said conveyor sections.

2. A sectional counter assembly comprising, a first counter section, a second counter section arranged end to end with said first section and in abutting relation thereto, a movable conveyor belt for each counter section extending substantially the full length of each section, and a transversely extending bridge overlapping the adjacent ends of said sections and secured to each section for uniting said sections into a single counter unit, the central portion overlapping said conveyor belts and having a convex upper surface substantially flush with the upper surface of said conveyor sections.

3. A bridge for securing and overlapping a joint between two end to end counter sections having conveyor belts on each of the upper surfaces of the counter sections comprising a plate of T-shaped cross sectional area having a crowned upper surface intermediate its ends, and flanged end portions constructed and arranged to be secured to each of the adjacent ends of said counter sections.

GEORGE T. SMITH.

REFERENCES CITED

The following references are of record in the file of this patent:

UNITED STATES PATENTS

| Number | Name | Date |
|---|---|---|
| 36,121 | Wise | Apr. 5, 1862 |
| 1,885,892 | Bronander | Nov. 1, 1932 |
| 2,338,359 | Sharp | Jan. 4, 1944 |
| 2,380,910 | Newton | July 31, 1945 |

FOREIGN PATENTS

| Number | Country | Date |
|---|---|---|
| 354,169 | Great Britain | July 21, 1931 |
| 531,700 | Great Britain | Jan. 9, 1941 |

Certificate of Correction

January 2, 1951

Patent No. 2,536,961

GEORGE T. SMITH

It is hereby certified that error appears in the printed specification of the above numbered patent requiring correction as follows:

Column 3, line 13, after the word "convex" insert *upper*; and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*